United States Patent [19]

Maxson

[11] Patent Number: 4,683,277
[45] Date of Patent: Jul. 28, 1987

[54] METHOD FOR PREPARING VINYL TERMINATED FLUORINE-CONTAINING POLYDIORGANOSILOXANE

[75] Inventor: Myron T. Maxson, Midland, Mich.

[73] Assignee: Dow Corning Corporation, Midland, Mich.

[21] Appl. No.: 881,304

[22] Filed: Jul. 2, 1986

[51] Int. Cl.[4] ............................................. C08G 77/04
[52] U.S. Cl. ........................................ 528/21; 528/32; 528/37; 528/38; 556/462
[58] Field of Search ................ 556/462; 528/21, 37, 528/32, 38

[56] References Cited

U.S. PATENT DOCUMENTS

| | | | |
|---|---|---|---|
| 2,489,138 | 11/1949 | Hyde et al. | 260/448.2 |
| 2,490,357 | 12/1949 | Hyde et al. | 260/46.5 |
| 2,634,284 | 4/1953 | Hyde | 260/448.2 |
| 2,737,506 | 3/1956 | Hurd et al. | 260/46.5 |
| 2,759,006 | 8/1956 | Dunham et al. | 260/448.2 |
| 2,759,008 | 8/1956 | Dunham et al. | 260/448.2 |
| 3,002,951 | 10/1961 | Johannson | 260/46.2 |
| 3,046,293 | 7/1962 | Pike | 260/448.2 |
| 3,243,410 | 3/1966 | McVannel | 260/46.5 |
| 3,719,619 | 3/1973 | Nagota et al. | 260/22 CB |
| 3,853,933 | 12/1974 | Siciliano | 260/448.2 E |
| 3,974,120 | 8/1976 | Razzano et al. | 260/30.8 |
| 3,978,104 | 8/1976 | Razzano | 260/448.2 E |
| 4,426,508 | 1/1984 | Dromard et al. | 528/23 |

FOREIGN PATENT DOCUMENTS 52-98798 8/1977 Japan .
55-50056 12/1980 Japan .

*Primary Examiner*—Melvyn I. Marquis
*Attorney, Agent, or Firm*—Robert Spector

[57] ABSTRACT

Liquid diorganovinylsiloxy terminated polydiorganosiloxanes wherein at least 50 percent of the hydrocarbon radicals bonded to silicon contain at least one perfluorinated carbon atom are prepared by polymerizing the corresponding diorganocyclosiloxane(s) at a temperature of from 25° to 150° C. under superatmospheric pressure and in the presence of a controlled amount of water and a catalytically effective amount of ammonia. The resultant silanol terminated polydiorganosiloxane is reacted with a hexaorganodisilazane containing a vinyl radical bonded to each of the two silicon atoms.

3 Claims, No Drawings

METHOD FOR PREPARING VINYL TERMINATED FLUORINE-CONTAINING POLYDIORGANOSILOXANE

BACKGROUND OF THE INVENTION

1. Field of the Invention

This invention relates to the preparation of polydiorganosiloxanes. More particularly, this invention relates to a method for preparing diorganovinylsiloxy terminated polydiorganosiloxanes containing fluorocarbon radicals bonded to silicon.

2. Description of the Prior Art

One method for preparing polydiorganosiloxanes is by the polymerization of cyclic diorganosiloxanes represented by the general formula $(R_2SiO)_n$ where R represents a monovalent unsubstituted or substituted hydrocarbon radical and n typically represents 3 or 4, depending upon the identity of the R radical. Numerous acidic and basic materials have been used to catalyze this polymerization.

The polymerization of diorganocyclosiloxanes in the presence of hydroxides of alkali metals such as potassium and sodium is disclosed in U.S. Pat. No. 2,489,138, which issued to Hyde and Daudt on Nov. 22, 1949 and U.S. Pat. No. 2,490,357, which issued to Hyde on Apr. 7, 1953. Alkali metal catalysts having a pH greater than 12 are disclosed in U.S. Pat. No. 2,634,284, which issued to Hyde on Dec. 6, 1949; cesium hydroxide in U.S. Pat. No. 2,737,506, which issued to Hurd et al. on Mar. 6, 1956; and the polymerization of cyclosiloxanes under superatmospheric pressure in the presence of basic catalysts, including alkali metal hydroxides and silanolates, in U.S. Pat. No. 2,759,007, which issued to Dunham et al. on Aug. 14, 1956. Using a mixture of a polyether and an alkali metal oxide, hydroxide, alkoxide, acyloxide or silanolate to catalyze the diorganocyclosiloxane polymerization is disclosed in Japanese Patent Publication No. 98,798/77.

Polymerization of diorganocyclosiloxanes in the presence of alkali metal, ammonium or phosphonium salts of mercaptans is taught in U.S. Pat. No. 3,243,410, which issued to McVannel on Mar. 29, 1966.

The production of hydroxyl terminated polydiorganosiloxanes from polydiorganosiloxanes in the form of liquids or gums or from cyclic diorganosiloxanes by heating any of these materials in a pressurized reactor in the presence of ammonia as a catalyst is taught in U.S. Pat. No. 3,046,293, which issued to Pike on July 24, 1964.

Among the acid catalysts that have been disclosed for diorganocyclosiloxane polymerization are sulfuric acid, phosphoric acid, phosphorus pentoxide, antimony pentachloride, boric acid, and the Lewis type acids such as boron trifluoride and aluminum trichloride. The use of these catalysts in combination with superatmospheric pressure is taught in U.S. Pat. No. 2,759,008, which issued to Dunham et al. on Aug. 14, 1956.

Acid activated carbon black as a catalyst for diorganocyclosiloxane polymerization is taught in U.S. Pat. No. 3,853,933, which issued to Siciliano on Dec. 10, 1974; using mineral supports coated with polymers having sulfonic or phosphoric acid groups as diorganocyclosiloxane polymerization catalysts is disclosed in U.S. Pat. No. 4,426,508, which issued to Dromard and Millet on Jan. 17, 1984.

Polydiorganosiloxanes wherein at least 50 percent of the repeating units contain a fluorinated hydrocarbon radical of the general formula $RfCH_2CH_2$— where Rf represents a perfluoroalkyl radical containing from 1 to 10 carbon atoms are characterized by their resistance to swelling and solubilization by liquid hydrocarbons such as gasoline and aviation fuels. Elastomers and resins prepared by curing these fluorine containing polydiorganosiloxanes are particularly desirable if the cured material is used as a coating or encapsulant for electronic devices or other substrates located in the engine compartment of automobiles or other vehicles.

U.S. Pat. No. 3,002,951, which issued to Johannson on Oct. 3, 1961, discloses using alkali metal hydroxides, quaternary ammonium hydroxides or the corresponding silanolates as catalysts for the polymerization of diorganocyclotrisiloxanes wherein the silicon atoms are each bonded to a non-fluorinated aliphatic radical containing fewer than three carbon atoms and a monovalent radical of the formula $RfCH_2CH_2$— where Rf is defined hereinabove.

U.S. Pat. No. 3,974,120, which issued to Razzano et al. on Aug. 10, 1976 teaches preparing diorganosiloxane copolymers having a viscosity of from 0.1 to 200 Pa.s by polymerizing mixtures containing from 40 to 85 mole percent of an alkyltrifluoropropyl cyclotrisiloxane and from 15 to 60 mole percent of a non-fluorinated diorganocyclotrisiloxane in the presence of (1) an aprotic solvent capable of dissolving both the monomers and the final polymer and (2) an alkyl lithium catalyst. The use of cesium hydroxide, cesium silanolate or a compound of the formula $R^*_4B^+ {}^-OSiR^*_3$, where $R^*$ represents a hydrocarbyl radical, as a catalyst for the polymerization of mixtures of fluorine-containing and non-fluorinated diorganocyclosiloxanes is taught in U.S. Pat. No. 3,978,104, which issued to Razzano et al. on Aug. 31, 1976. Japanese Patent Publication No. 50056/80 discloses using potassium hydroxide to catalyze the polymerization of mixtures containing 100 parts by weight of fluorine-containing diorganocyclotrisiloxanes and from 70 to 900 parts of non-fluorinated diorganocyclotrisiloxanes.

Vinyl terminated polydiorganosiloxanes can be prepared by polymerizing at least one diorganocyclotrisiloxane using a base catalyst such as potassium silanolate or an acid catalyst such as sulfuric acid and including in the reaction mixture at least an equimolar amount of a hexaorganodisiloxane of the general formula $(R''_2ViSi)_2O$ where Vi represents vinyl and $R''$ represents a monovalent hydrocarbon radical free of ethylenic unsaturation. Alternatively, a hydroxyl terminated polydiorganosiloxane is reacted with a hexaorganodisilazane of the general formula $(R''_2ViSi)_2NH$.

The present inventor found that the catalyst used to polymerize diorganocyclotrisiloxanes containing a $RfCH_2CH_2$— radical and a non-fluorinated hydrocarbon radical bonded to each silicon atom has a substantial influence on the thermal stability of cured products, particularly gels, obtained by reacting a vinyl terminated polydiorganosiloxane prepared from one or more of these cyclic disiloxanes with an organohydrogensiloxane in the presence of a platinum catalyst. Polyorganosiloxane gels are easily deformable, elastomeric materials exhibiting a hardness value lower than 25 on the Shore 00 durometer scale. The hardness of some gels is too low for measurement on this scale, and is expressed as the depth to which a penetrometer probe of specified dimensions will penetrate or depress the surface of the gel under a specified loading.

The accompanying examples demonstrate that when conventional non-volatile acidic and basic catalysts of the prior art are used to prepare diorganovinylsiloxy terminated polydiorganosiloxanes wherein at least 50 mole percent of the repeating units contain a fluorinated hydrocarbon radical such as 3,3,3-trifluoropropyl bonded to silicon, gels prepared by reacting these polymers with an organohydrogensiloxane often discolor and harden during relatively short exposures to temperatures of 100° C. and above. Some gels discolor during curing.

An objective of this invention is to provide a method for preparing thermally stable liquid diorganovinylsiloxy terminated polydiorganosiloxanes containing repeating units of the formula R(RfCH$_2$CH$_2$)SiO where Rf represents a perfluorinated hydrocarbon radical containing from 1 to 10 carbon atoms and R represents a monovalent non-fluorinated hydrocarbon radical containing from 1 to 20 carbon atoms.

SUMMARY OF THE INVENTION

Liquid diorganovinylsiloxy terminated polydiorganosiloxanes wherein at least 50 percent of the hydrocarbon radicals bonded to silicon contain at least one perfluorinated carbon atom are prepared by polymerizing the corresponding diorganocyclosiloxane(s) at a temperature of from 25° to 150° C. under superatmospheric pressure and in the presence of a controlled amount of water and a catalytically effective amount of ammonia. The resultant silanol terminated polydiorganosiloxane is reacted with a hexaorganodisilazane containing a vinyl radical bonded to each of the two silicon atoms.

DETAILED DESCRIPTION OF THE INVENTION

This invention provides a method for preparing a liquid polydiorganosiloxane of the average molecular formula ViR"$_2$Si(OSiRR')$_n$OSiR"$_2$Vi where each R is individually a monovalent saturated or aromatic hydrocarbon radical containing from 1 to 20 carbon atoms, from 50 to 100% of the R' radicals represent the radical RfCH$_2$CH$_2$— where Rf in turn represents a perfluoroalkyl radical containing from 1 to 10 carbon atoms, any remaining R' radicals being selected from the same group as R, R" is selected from the same group as R or R', Vi represents a vinyl radical, and n represents an integer from 10 to 200 and is equivalent to a viscosity value for said polydiorganosiloxane of from $0.2 \times 10^{-3}$ to about 0.01 m$^2$/second at 25° C., said method comprising the steps of (1) reacting a cyclotrisiloxane of the general formula (R'RSiO)$_3$ with from 1.5 to about 50 mole percent, based on said cyclotrisiloxane, of water at a temperature of from 25° to 150° C. in a closed vessel and in the presence of an amount of ammonia sufficient to generate a pressure of from 140 to 1050 kilopascals within said vessel and continuing the reaction for a time period sufficient to form a silanol terminated polymer represented by the average formula HO(RR'SiO)$_n$H; (2) reacting each mole of said hydroxyl terminated polymer with at least one mole of a disilazane of the formula (ViR'$_2$Si)$_2$NH, at a temperature of from 50 to 100° C. for a sufficient time to form said polydiorganosiloxane, and (3) isolating said polydiorganosiloxane from the reaction mixture.

The diorganocyclotrisiloxanes used as starting materials to prepare polydiorganosiloxanes in accordance with the present method are known compounds. The compounds are typically obtained by a controlled hydrolysis of the corresponding diorganodihalosilanes. The hydrocarbon radicals bonded to silicon, represented by R and R' in the foregoing formulae can contain from one to twenty carbons. The selection of a particular hydrocarbon radical is limited only by the availability and cost of the corresponding starting material. For this reason R is preferably alkyl containing from 1 to 4 carbon atoms or phenyl. To achieve the desired resistance to solubilization by liquid hydrocarbons, at least 50 mole percent of the R' radicals are 3,3,3-trifluoropropyl and any remaining ones are selected from the same group as R. Most preferably R is methyl or phenyl and from 75 to 100 mole percent of the R' radicals are 3,3,3-trifluoropropyl. Polymethyl-3,3,3-trifluoropropylsiloxanes are particularly preferred.

Depending upon whether it is desired to prepare a homopolymer or a copolymer, one or more diorganocyclotrisiloxanes represented by the foregoing general formula are polymerized in accordance with the present method. If mixtures of two or more cyclic siloxanes are being polymerized, the radicals represented by R and/or R' in the component cyclosiloxanes can be identical or different, the only proviso being that at least 50 mole percent of the R' radicals correspond to the formula RfCH$_2$CH$_2$—, where Rf is as defined hereinabove.

The polymerization reaction mixture includes an amount of water equivalent to from 1.5 to about 50 mole percent, preferably from 3 to 30 mole percent, based on the cyclic siloxane(s). The amount of water present determines the molecular weight of the resultant silanol terminated polydiorganosiloxane. It will be understood by those skilled in the art that as the amount of water is increased the molecular weight of the polydiorganosiloxane is usually correspondingly lowered.

The amount of water required to achieve a desired molecular weight can be readily calculated from the number of moles of cyclic siloxane, and does not form part of this invention. The polydiorganosiloxanes prepared in accordance with the present method typically contain an average of from 10 to about 200 repeating units per molecule.

The polymerization of the cyclic siloxane(s) is catalyzed by ammonia that is contained within the reactor under superatmospheric pressure. The amount of ammonia present is sufficient to generate a pressure of from 135 to about 1050 kilopascals within a closed reactor at the reaction temperature, which can be from 25° to 150° C. To achieve the optimum combination of high yield and a relatively short reaction time, the temperature of the reaction mixture is preferably from 50° to about 100° C. with an ammonia pressure of from 200 to about 700 kilopascals.

In a typical polymerization conducted in accordance with the present method a pressurizable reactor is charged with the diorganocyclosiloxane(s) and water. The reactor is then sealed and gaseous ammonia is introduced until the pressure within the reactor reaches the desired level. The contents of the reactor are then heated to a temperature of from 25° to 150° C. and stirred for a period of time sufficient to achieve an average degree of polymerization of from 10 to 200, depending upon the end use application of the final polymer. The reaction time is typically from 2 to about 8 hours.

In accordance with the second step of the present method, the silanol terminated polydiorganosiloxane obtained from the polymerization reaction described in the preceding paragraph is reacted with at least an equimolar amount of a hexaorganodisilazane represented by the general formula (ViR''$_2$Si)$_2$NH. More than two moles of disilazane per mole of polydiorganosiloxane serves no useful purpose and may even be detrimental by reducing the yield of the desired vinyl terminated polydiorganosiloxane. Sym-divinyltetramethyldisilazane is the preferred reactant on the basis of its cost and availability. Any other disilazane corresponding to the foregoing formula can be used so long as it is compatible with the silanol terminated polymer.

The silanol terminated polymer can be reacted directly with the disilazane without being isolated from the reaction mixture or purified. The amount of ammonia remaining in the reaction mixture will usually be sufficient to catalyze the reaction of the polymer with the disilazane. This reaction is conducted at a temperature of from 50 to 100° C. A reaction time of from 4 to about 24 hours with stirring will usually be sufficient to achieve substantially complete conversion from silanol—to diorganovinylsiloxy terminated polymer. During this time period the ammonia remaining in the reaction mixture is allowed to escape from the reactor.

The only additional processing step prior to isolation of the final polymer is the removal of any unreacted cyclic siloxanes, ammonia and any other volatile byproducts. This is conveniently accomplished by heating the reaction mixture under reduced pressure for a period of time sufficient to remove these byproducts. Temperatures of from 100° to about 300° C. and pressures of from 250 to about 1000 pascals applied for about one hour are usually sufficient to purify the final polymer.

Both the polymerization of the cyclic siloxane(s) and reaction of the resultant silanol terminated polymer with the vinyl substituted disilazane can be conducted in the absence of solvent as described in the preceding paragraphs. The present method does not preclude the presence of inert solvents in the reaction mixture if required to ensure compatibility of the reactants or to achieve precise control of the reaction temperature by conducting the reaction at the boiling point of the solvent. Solvents suitable for this purpose include cyclic ethers such as tetrahydrofuran and ketones such as methylethyl ketone. The boiling point of the solvent should low enough to permit its removal during purification of the final polymer as described hereinabove.

An advantage of using ammonia as the catalyst is the absence of the neutralization step required for nonvolatile acidic or basic catalysts of the prior art. The product of the neutralization step is typically an insoluble salt that must be separated from the final polymer.

In addition to simplifying preparation of the polymer by the elimination of catalyst neutralization, the use of ammonia as the catalyst typically produces the desired polymer in relatively pure form and in yields of at least 90 percent, which in many instances is higher than can be achieved using conventional non-volatile base or acid catalysts such as potassium silanolate and trifluoromethanesulfonic acid. The accompanying examples demonstrate that a 95 percent yield of the diorganovinylsiloxy terminated polymer is obtained using the present method compared with only a 60 percent yield using trifluoromethanesulfonic acid as the catalyst.

As discussed hereinabove, the fluorinated polydiorganosiloxanes obtained using the present method are particularly desirable for preparing gels by the reaction of these polymers with an organohydrogensiloxane containing an average of at least two silicon bonded hydrogen atoms per molecule in the presence of a platinum containing catalyst. The resultant gels resist discoloration and hardening when exposed to temperatures from about 50° C. up to about 300° C.

The following examples disclose a preferred embodiment of the present method and compare the thermal stability of a polyorganosiloxane gel prepared from the resultant polydiorganosiloxane with similar gels prepared from polydiorganosiloxanes obtained using typical prior art catalysts.

EXAMPLE 1

This example describes the preparation of a polydiorganosiloxane in accordance with the present method.

A reactor was charged with 153.7 parts of 2,4,6-trimethyl-2,4,6tris(3,3,3-trifluoropropyl)cyclotrisiloxane and 1 part of water, sealed and charged with ammonia to a pressure of 207 kPa. The contents of the reactor were stirred, heated to a temperature of 50° C. and maintained at this temperature for 4 hours with continuous stirring.

The resultant hydroxyl terminated polymethyl-3,3,3-trifluoropropylsiloxane exhibited a viscosity of 0.0013 m2/second at 25° C. A 1413 part portion of this polymer was combined with 92 parts of sym-divinyltetramethyldisilazane, stirred and heated to a temperature of 80° C. During this period the ammonia remaining in the reaction mixture was allowed to escape from the reactor. The reaction mixture was then stirred and maintained at a temperature of 80° C. for 8 hours, following which volatile materials were removed by connecting the reactor to a vacuum source and maintaining the reaction mixture at a temperature of 250° C. for one hour. During this period the pressure within the reactor decreased from 520 to 260 pascals.

The final product, a dimethylvinylsiloxy terminated poly(methyl-3,3,3-trifluoropropyl)siloxane was obtained in 95 percent yield, based on the initial cyclotrisiloxane, exhibited a viscosity of 0.0014 m$^2$/second at 25° C. and a vinyl content of 1.05 weight percent.

EXAMPLE 2 (COMPARATIVE EXAMPLE)

This example describes the preparation of a polydiorganosiloxane by the controlled hydrolysis of a cyclotrisiloxane in the presence of a prior art catalyst, trifluoromethanesulfonic acid.

A reactor was charged with 2500 parts of 2,4,6-trimethyl-2,4,6-tris(3,3,3-trifluoropropyl)cyclotrisiloxane, 411 parts of a hydroxyl terminated poly(methyl-3,3,3-trifluoropropyl)siloxane containing an average of from 3 to 4 siloxane units per molecule, 1.6 parts of trifluoromethanesulfonic acid and 0.62 part of water. The contents of the reactor were heated to a temperature of between 40° and 50° C. and maintained at this temperature for 16 hours with continuous stirring. The reaction mixture was then neutralized by adding 80 parts of sodium bicarbonate after which it was filtered to yield a hydroxyl terminated poly(methyl-3,3,3-trifluoropropyl)siloxane exhibiting a viscosity of 0.34×10$^{-3}$ m$^2$/second at 25° C. A 606 part portion of this polymer was charged into a reactor together with 46 parts of sym-divinyltetramethyldisilazane and the resultant mixture was stirred while being heated to a temperature of 80° C. and allowing ammonia to escape from the reactor. Heating and stirring were continued for 8 hours, at which time volatile materials were removed from the reaction mixture using the procedure described in the preceding Example 1.

The viscosity of the resultant dimethylvinylsiloxy terminated poly(methyl-3,3,3-trifluoropropyl)siloxane was $0.7 \times 10^{-3}$ m$^2$/second at 25° C., and the yield of polymer was 60 percent, based on the initial cyclotrisiloxane. Both the yield of polymer and its viscosity were lower than the values obtained by practicing the present method as described in the preceding Example 1.

EXAMPLE 3 (COMPARATIVE EXAMPLE)

This example demonstrates the extra processing steps required using lithium silanolate, a prior art catalyst, for the polymerization of fluorine-containing cyclic diorganosiloxanes, the lower yield of polydiorganosiloxane relative to the present method and the poor thermal stability of a gel obtained by hydrosilation of a vinyl-terminated polymethyl-3,3,3-trifluoropropylsiloxane obtained from this polydiorganosiloxane.

The catalyst was prepared by reacting 1.92 parts lithium hydroxide and 37.1 parts 2,4,6-trimethyl-2,4,6-tris-(3,3,3-trifluoropropyl)cyclotrisiloxane at a temperature of about 30° C. for about four hours using 36 parts tetrahydrofuran as the diluent and, as the initiator, 0.18 part of a solution prepared by dissolving 2.4 parts lithium hydroxide in 40 parts of water. The resultant mixture was filtered to isolate the solubilized catalyst.

A vinyl terminated poly(methyl-3,3,3-trifluoropropyl)siloxane was prepared by charging a glass reactor with 200 parts of 2,4,6-trimethyl-2,4,6-tris(3,3,3-trifluoropropyl)cyclotrisiloxane, 5.74 parts of dimethylvinylsilanol, and 1.68 parts of the solubilized lithium silanolate. The resultant mixture was heated at a temperature of 150° C. for five hours under a flow of nitrogen, after which a stoichiometric excess of finely divided solid carbon dioxide was added to the reactor to neutralize the catalyst. After the reaction mixture cooled it was filtered under pressure and then concentrated at a temperature of 195° C. under a pressure of 130 pascals to obtain a 90% yield of the final polymer, based on the initial cyclic disiloxane.

An organosilicon composition curable to a gel was prepared by blending to homogeniety 97.39 parts of a vinyl terminated polydiorganosiloxane obtained as described in the immediately preceding paragraph; 2.39 parts of an organohydrogensiloxane crosslinking agent represented by the average formula

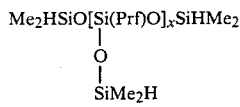

where Me represents a methyl radical, the average value of x is between 1 and 3, inclusive, and the silicon bonded hydrogen content is 0.67%; 0.2 part of a complex prepared by the reaction of hexachloroplatinic acid with a liquid dimethylvinylsiloxy terminated poly(-methyl-3,3,3-trifluoropropyl)siloxane and 0.2 part of 2-methyl-3-butyn-2-ol as a catalyst inhibitor. The catalyst contained 0.67% platinum. The resultant composition was deaired under reduced pressure, poured into a wide mouth container and cured by heating it for one hour at 150° C. The thickness of the cured gel layer was 1.9 cm.

The penetration value of the gel was measured using a penetrometer manufactured by the Precision Scientific Company, catalog No. 73,510. The standard cones supplied with the instrument were replaced with a brass head measuring 6.350 mm. in diameter, 4.762 mm. in height and having a flat bottom and rounded edges. The total weight of the shaft and head was 19.5 grams.

The penetration value of the cured gel was 5.0 mm. The gel sample was then placed in an oven heated to a temperature of 125° C. for 24 hours. During this period a hard skin formed over the surface of the gel.

For purposes of comparison a gel was prepared from a similar composition, with the exception that the vinyl terminated polymer was the one described in the preceding Example 1, and prepared in accordance with the present method.

The curable composition contained 193 parts of the vinyl terminated polymer, 6.5 parts of the organohydrogensiloxane, 0.15 part of the platinum containing catalyst and 0.13 part of the catalyst inhibitor.

After curing for one hour at a temperature of 150° C. the penetration value of the colorless gel was 3.7 mm. This value was substantially unchanged after the gel had been heated for seven days in an oven maintained at a temperature of 150° C. There was no evidence of discoloration following heating.

That which is claimed is:

1. A method for preparing a liquid polydiorganosiloxane of the average molecular formula ViR"$_2$Si(OSiRR'-)$_n$OSiR"$_2$Vi where each R is individually a monovalent saturated or aromatic hydrocarbon radical containing from 1 to 20 carbon atoms, from 50 to 100% of the R' radicals represent the radical RfCH$_2$CH$_2$— where Rf in turn represents a perfluoroalkyl radical containing from 1 to 10 carbon atoms, any remaining R' radicals being selected from the same group as R, R" is selected from the same group as R or R', Vi represents a vinyl radical, and n represents an integer from 10 to 200 and is equivalent to a viscosity value for said polydiorganosiloxane of from $0.2 \times 10^{-3}$ to about 0.01 m$^2$/second at 25° C., said method comprising the steps of (1) reacting a cyclotrisiloxane of the general formula (SiORR')$_3$ with from 1.5 to about 50 mole percent, based on said cyclotrisiloxane, of water at a temperature of from 25° to 150° C. in a closed vessel and in the presence of an amount of ammonia sufficient to generate a pressure of from 140 to 1050 kilopascals within said vessel and continuing the reaction for a time period sufficient to form a silanol terminated polymer represented by the average formula HO(RR'SiO)$_n$H, (2) reacting each mole of said hydroxyl terminated polymer with at least one mole of a disilazane of the formula (ViR"$_2$Si)$_2$NH, at a temperature of from 50 to 100° C. for a sufficient time to form said polydiorganosiloxane, and (3) isolating said polydiorganosiloxane from the reaction mixture.

2. A method according to claim 1 where R and R" are individually selected from lower alkyl containing from 1 to 4 carbon atoms and phenyl, Rf is F$_3$C—, the reaction of said cyclotrisiloxane is conducted at a temperature of from 50° to 100° C. in the presence of from 0.03 to 0.3 mole of water per mole of cyclotrisiloxane and an amount of ammonia sufficient to generate a pressure of from 200 to about 700 kilopascals within said vessel, the molar ratio of said disilazane to said polymer is from 1 to 2 and the reaction of said disilazane with said polymer is conducted at a temperature of from 50° to 100° C.

3. A method according to claim 2 where R and R" are methyl and the polydiorganosiloxane exhibits a viscosity of from $1 \times 10^{-3}$ to 0.1 m$^2$/sec at 25° C.

* * * * *